US012711334B1

(12) United States Patent
Gal et al.

(10) Patent No.: US 12,711,334 B1
(45) Date of Patent: Aug. 18, 2026

(54) REAL-TIME ASSIGNMENT OF ASSET IDENTIFIERS TO A DEPLOYED DEVICE

(71) Applicant: Samsara Inc., San Francisco, CA (US)

(72) Inventors: David Gal, Oakland, CA (US); Eli Peer, San Carlos, CA (US); Christian Almer, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 469 days.

(21) Appl. No.: 18/307,464

(22) Filed: Apr. 26, 2023

Related U.S. Application Data

(60) Provisional application No. 63/363,683, filed on Apr. 27, 2022.

(51) Int. Cl.
*G06K 7/00* (2006.01)
*G06K 7/10* (2006.01)

(52) U.S. Cl.
CPC ................................ *G06K 7/10297* (2013.01)

(58) Field of Classification Search
CPC ........... G06K 7/10297; G06K 7/10376; G06K 7/10386; G06K 7/10405; G06K 7/10415; G06K 7/10435; G06K 7/1095
See application file for complete search history.

(56) References Cited

U.S. PATENT DOCUMENTS

| | | | | |
|---|---|---|---|---|
| 2020/0267253 | A1* | 8/2020 | Grunfeld | H04W 12/06 |
| 2021/0150159 | A1* | 5/2021 | Volkerink | G06K 19/07758 |
| 2021/0390509 | A1* | 12/2021 | Fowler | G06K 7/1417 |
| 2022/0050976 | A1* | 2/2022 | Bergeron | G06F 21/6245 |

* cited by examiner

*Primary Examiner* — Ping Y Hsieh

(74) *Attorney, Agent, or Firm* — Schwegman Lundberg & Woessner, P.A.

(57) ABSTRACT

A system to perform operations that include: assigning an asset identifier to a near-field communication (NFC) tag within a database; receiving, from a deployed device, a request that includes a reference to the NFC tag, the deployed device corresponding with a device identifier; assigning the device identifier of the deployed device to the asset identifier within the database response to receiving the request; receiving a data object from the deployed device; and presenting a notification based on the data object, the notification includes a display of the asset identifier assigned to the device identifier of the deployed device.

20 Claims, 7 Drawing Sheets

ASSIGNING AN ASSET IDENTIFIER TO AN NFC TAG WITHIN A DATABASE
302

RECEIVING, FROM A DEPLOYED DEVICE, A REQUEST THAT INCLUDES A REFERENCE TO THE NFC TAG, THE DEPLOYED DEVICE CORRESPONDING WITH A DEVICE IDENTIFIER
304

ASSIGNING THE DEVICE IDENTIFIER OF THE DEPLOYED DEVICE TO THE ASSET IDENTIFIER WITHIN THE DATABASE
306

RECEIVING A DATA OBJECT FROM THE DEPLOYED DEVICE
308

PRESENTING A NOTIFICATION BASED ON THE DATA OBJECT, THE NOTIFICATION INCLUDING A DISPLAY OF THE ASSET IDENTIFIER ASSIGNED TO THE DEVICE IDENTIFIER OF THE DEPLOYED DEVICE
310

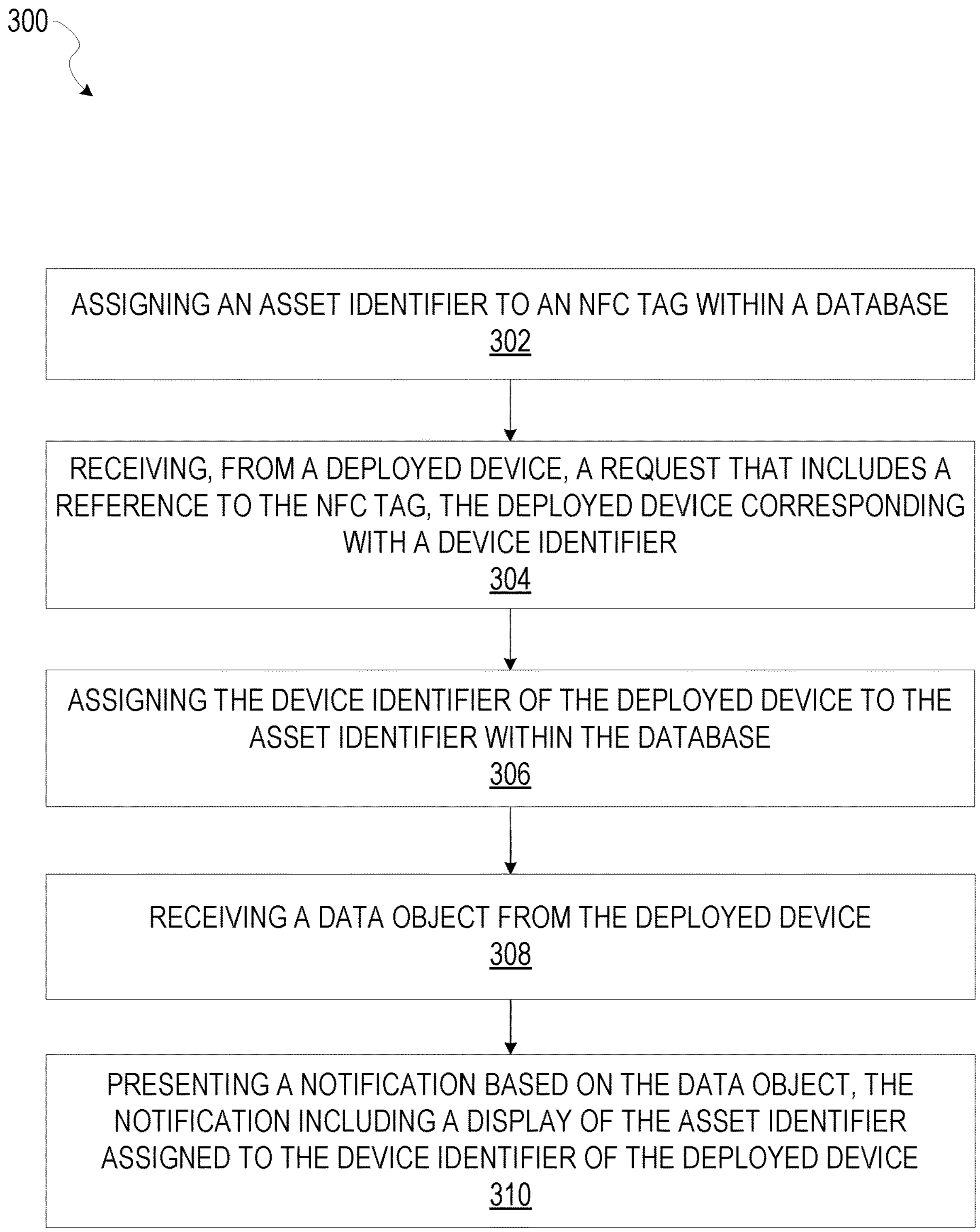

*FIG. 3*

RECEIVING A SECOND REQUEST THAT COMPRISES A REFERENCE TO THE NFC TAG FROM A SECOND DEPLOYED DEVICE
402

DISASSOCIATING THE DEVICE IDENTIFIER OF THE DEPLOYED DEVICE FROM THE NFC TAG WITHIN THE DATABASE
404

ASSIGNING A SECOND DEVICE IDENTIFIER ASSOCIATED WITH THE SECOND DEPLOYED DEVICE TO THE NFC TAG WITHIN THE DATABASE BASED ON THE SECOND REQUEST
406

REAL-TIME ASSIGNMENT OF ASSET IDENTIFIERS TO A DEPLOYED DEVICE

PRIORITY APPLICATION

This application claims priority to U.S. Provisional Patent Application Ser. No. 63/363,683, filed on Apr. 27, 2022, the disclosure of which is incorporated by reference herein in its entirety.

TECHNICAL FIELD

Embodiments of the present disclosure relate generally the field of communication technology and, more particularly, but not by way of limitation, to systems and methods for tracking deployed devices.

BACKGROUND

A Global Positioning System (GPS) tracking unit, geotracking unit, or simply "tracker" is a navigation device normally on a vehicle, asset, person or animal that uses GPS to determine its movement and geographic position. GPS tracking systems used in commercial fleets are often configured to transmit location and telemetry input data at a set update rate or when an event (door open/close, auxiliary equipment on/off, geofence border cross) triggers the unit to transmit data. Live GPS tracking used in commercial fleets generally refers to systems that update regularly at one-minute, two-minute or five-minute intervals while the ignition status is on. Some tracking systems combine timed updates with heading change triggered updates.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of assigning an asset identifier to a deployed device, according to certain example embodiments.

DETAILED DESCRIPTION

Figure 1:
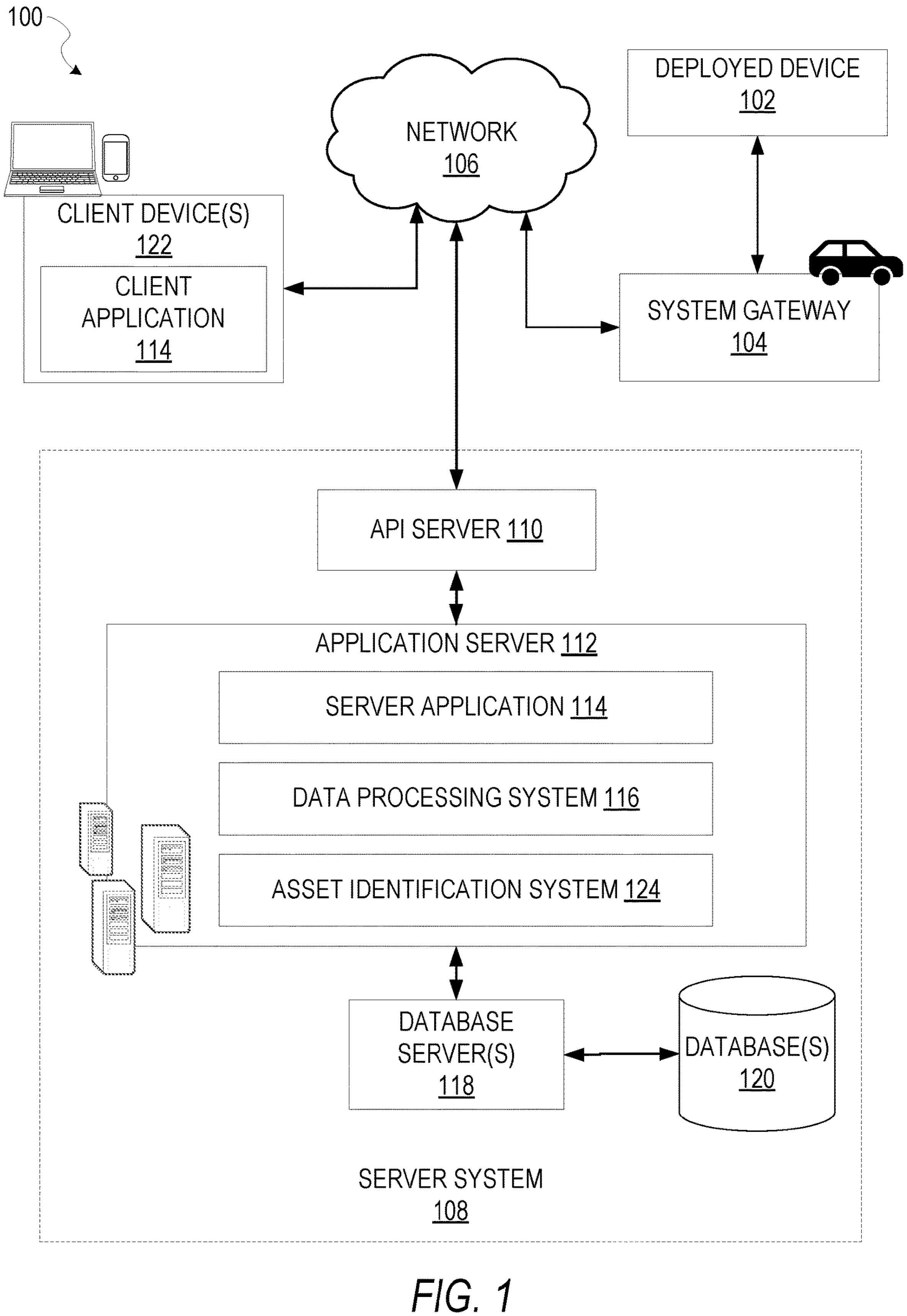
FIG. 1 is a block diagram showing an example system for exchanging data (e.g., sensor data and associated content) over a network in accordance with some embodiments, wherein the system includes a asset identification system.

As discussed above, GPS tracking systems used in commercial fleets may be configured to transmit location and telemetry input data at a set update rate. For example, live GPS tracking used in commercial fleets generally refers to systems that update regularly at one-minute, two-minute or five-minute intervals while the ignition status is on. A problem with this approach is that as the rate of system updates increases, the battery life of the tracking unit is greatly reduced. Moreover, changing or recharging batteries in traditional tracking units is not always feasible, due to the significant time required to change or recharge such batteries. For example, to change batteries, a user would need to unscrew a battery cover, which is often weather-proofed, then make sure they have adequate replacement batteries.

In some instances, a user may instead opt to simply swap out the tracking device itself, however doing so under traditional system may not always be feasible. For example, a user would need to remove the old device, activate a new device, then setup the new device by manually assigning the appropriate asset identifier to the new device in a cloud environment. This method is often tedious and prone for errors.

According to certain example embodiments, an improved system which may automatically assign asset identifiers to a deployed tracking device, in real-time, is described herein. For example, a system may be configured to perform operations that include: assigning an asset identifier to a near-field communication (NFC) tag within a database; receiving, from a deployed device, a request that includes a reference to the NFC tag, the deployed device corresponding with a device identifier; assigning the device identifier of the deployed device to the asset identifier within the database response to receiving the request; receiving a data object from the deployed device; and presenting a notification based on the data object, the notification includes a display of the asset identifier assigned to the device identifier of the deployed device.

According to certain embodiments, the data object transmitted by the deployed device may include: location data; temporal data; an asset identifier; as well as asset attributes. The deployed device may be configured to transmit a data object at a set update rate and/or upon the detection of some predefined event (i.e., ignition of vehicle is keyed on, vehicle passes over predefined boundary, auxiliary equipment on/off, etc.) that may trigger the deployed device to transmit data. For example, in some embodiments the deployed device may include one or more sensor devices configured to measure or otherwise determine various attributes that may be associated with a tracked asset.

In some embodiments, a user may disassociate the device identifier associated with the deployed device with the asset identifier within the database in order to associate a different device identifier with the asset identifier within the database. For example, the deployed device may be a first deployed device, and the system may be configured to perform operations that include: receiving, from a second deployed device, a second request that comprises the reference to the NFC tag; and assigning a second device identifier associated with the second deployed device with the asset identifier within the database responsive to receiving the second request.

In some embodiments, the system may present a notification at a client device responsive to receiving the data object from the deployed device. The notification may include a display of a graphical element that corresponds with the asset identified by the asset identifier at a position within a map image based on the data object. For example, in some embodiments, the asset identifier may be associated with various settings that include one or more notification attributes, wherein the settings include a ping rate and a ping schedule, as well as notification attributes that include graphical properties of notifications to be presented, as well as an identification of one or more client devices (or administrator accounts) in which the notifications should be presented. In some embodiments, a user may update the settings associated with the asset identifier associated with the NFC tag based on inputs provided via a client device.

In some embodiments, the NFC tag may be applied to a bracket or mount configured to retain the deployed device, and wherein the deployed device includes an integrated NFC reader. Accordingly, upon detecting the NFC tag at the deployed device, the system may be configured to cause the deployed device to transmit a request to the system, wherein the request include a reference to the NFC tag and a device identifier associated with the deployed device. The system may thereby associate the device identifier with an asset identifier associated with an asset assigned to the NFC tag within a database.

FIG. 1 is a block diagram showing an example system 100 for selectively recording portions of a data stream, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the deployed device 102 and the system gateway 104. While certain functions of the system 100 are described herein as being performed by either a client application 114, the deployed device 102, the system gateway 104, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, or one or more processors of the deployed device 102, or system gateway 104, where there may be sufficient processing capacity.

The server system 108 supports various services and operations that are provided to the client application 114. Such operations include transmitting data to, receiving data from, and processing data generated by the client application 114, the deployed device 102, and the system gateway 104. In some embodiments, the deployed device 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the deployed device 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an asset identification system 124. According to certain example embodiments, the asset identification system 124 is configured to perform operations that include: assigning an asset identifier to an NFC tag within a database; receiving, from a deployed device, a request that includes a reference to the NFC tag, the deployed device corresponding with a device identifier; assigning the device identifier of the deployed device to the asset identifier within the database response to receiving the request; receiving a data object from the deployed device; and presenting a notification based on the data object, the notification includes a display of the asset identifier assigned to the device identifier of the deployed device. Further details of the asset identification system 124 can be found in FIG. 2 below.

The server application 114 implements a number of data processing technologies and functions, particularly related to the aggregation and other processing of data (e.g., sensor data generated by the deployed device 102). As will be described in further detail, the sensor data, including temporal data, asset status data, and GPS data points, generated by the deployed device 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the deployed device 102 and processed by the server application 114.

Figure 2:
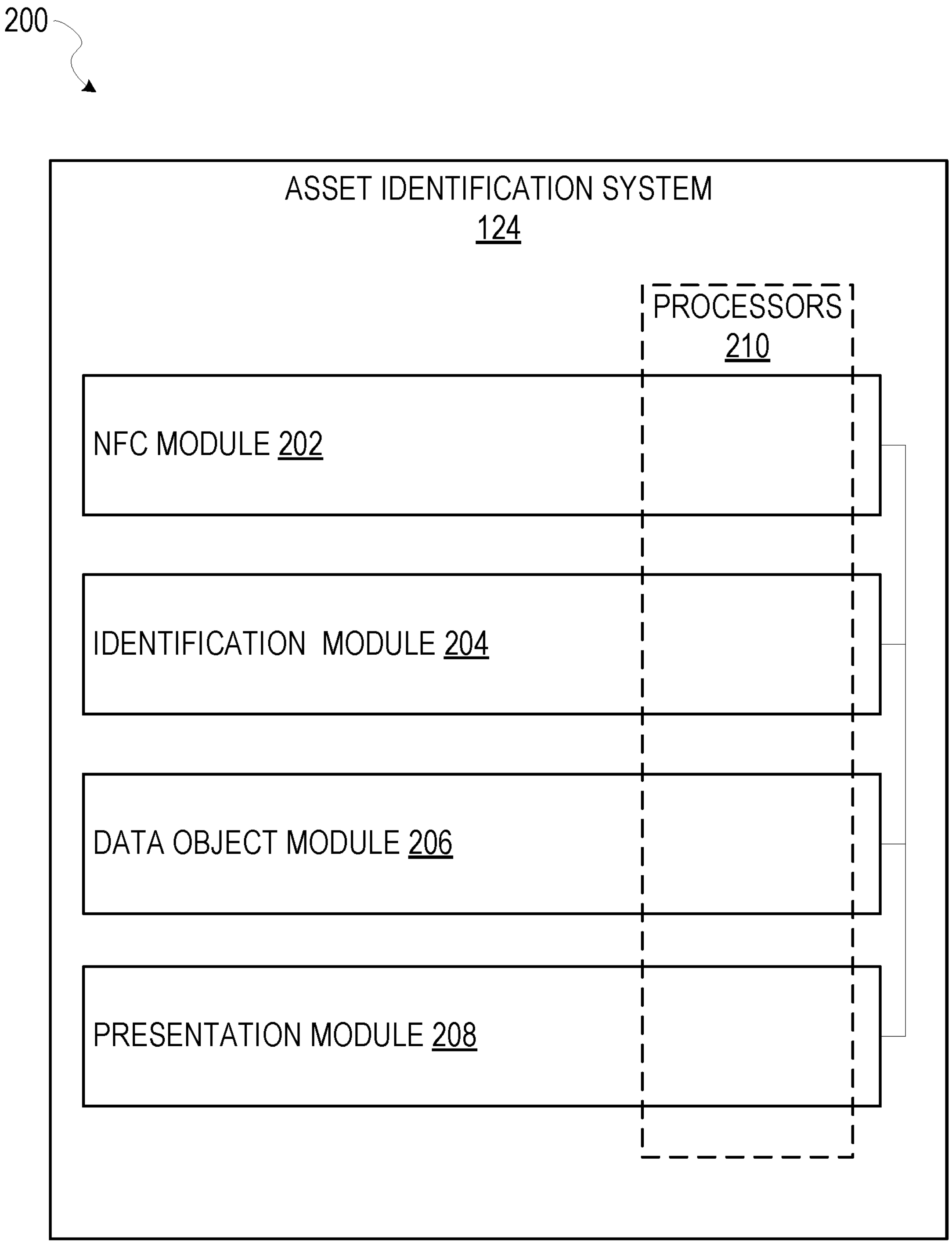
FIG. 2 is a block diagram illustrating various modules of a asset identification system, according to certain example embodiments.

FIG. 2 is a block diagram 200 illustrating components of the asset identification system 124 that configure the asset identification system 124 to perform operations to present notifications that indicate an asset status, according to some example embodiments.

The asset identification system 124 is shown as including an NFC module 202, an identification module 204, a data object module 206, and a presentation module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the asset identification system 124 may physically include an arrangement of one or more of the processors 210 (e.g., a subset of or among the one or more processors of the machine) configured to perform the operations described herein for that module. As another example, any module of the analytics reporting system 124 may include software, hardware, or both, that configure an arrangement of one or more processors 210 (e.g., among the one or more processors of the machine) to perform the operations described herein for that module. Accordingly, different modules of the analytics reporting system 124 may include and configure different arrangements of such processors 210 or a single arrangement of such processors 210 at different points in time. Moreover, any two or more modules of the analytics reporting system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 3 is a flowchart depicting a method 300 of assigning an asset identifier to a deployed device 102, according to certain example embodiments. Operations of the method 300 may be performed by the modules described above with respect to FIG. 2. As shown in FIG. 3, the method 300 includes one or more operations 302, 304, 306, 308, and 310.

At operation 302, the NFC module 202 assigns an asset identifier to an NFC tag within a database. A user of the asset identification system 124 may provide an input that associates the asset identifier of a particular asset to an NFC tag within a database 120. Accordingly, the NFC tag may correspond with an NFC tag which has been applied to an asset, wherein the asset may for example include: a vehicle; heavy machinery; a shipping container; or any other similar object to be tracked.

At operation 304, the NFC module 202 receives, from a deployed device, a request that includes a reference to the NFC tag, and wherein the deployed device corresponds with a device identifier. For example, in some embodiments, the deployed device may include an NFC reader. Upon detecting an NFC tag proximate to the NFC reader, the deployed device may be configured to transmit a request to the asset identification system 124.

At operation 306, responsive to receiving the request from the deployed device, the NFC module 202 assigns the device identifier associated with the deployed device to the asset identifier that corresponds with the NFC tag within the database 120.

At operation 308, the data object module 206 receives a data object from the deployed device. For example, the deployed device may be configured to transmit a data object regularly at some predefined interval (i.e., one-minute, two-minute or five-minute intervals), or responsive to the detection of some trigger condition (i.e., detection of movement, etc.).

In some embodiments, the data object may comprise one or more of: location data; temporal data; and asset status information, wherein the asset status information may be based on one or more sensor devices which may be communicatively coupled with the deployed device.

At operation 310, the presentation module 208 generates and presents a notification based on the data object, wherein the notification includes a display of the asset identifier assigned to the device identifier of the deployed device. For example, the notification may include a display of a graphical icon at a position within a map image, wherein the position is based on the data object.

Figure 4:
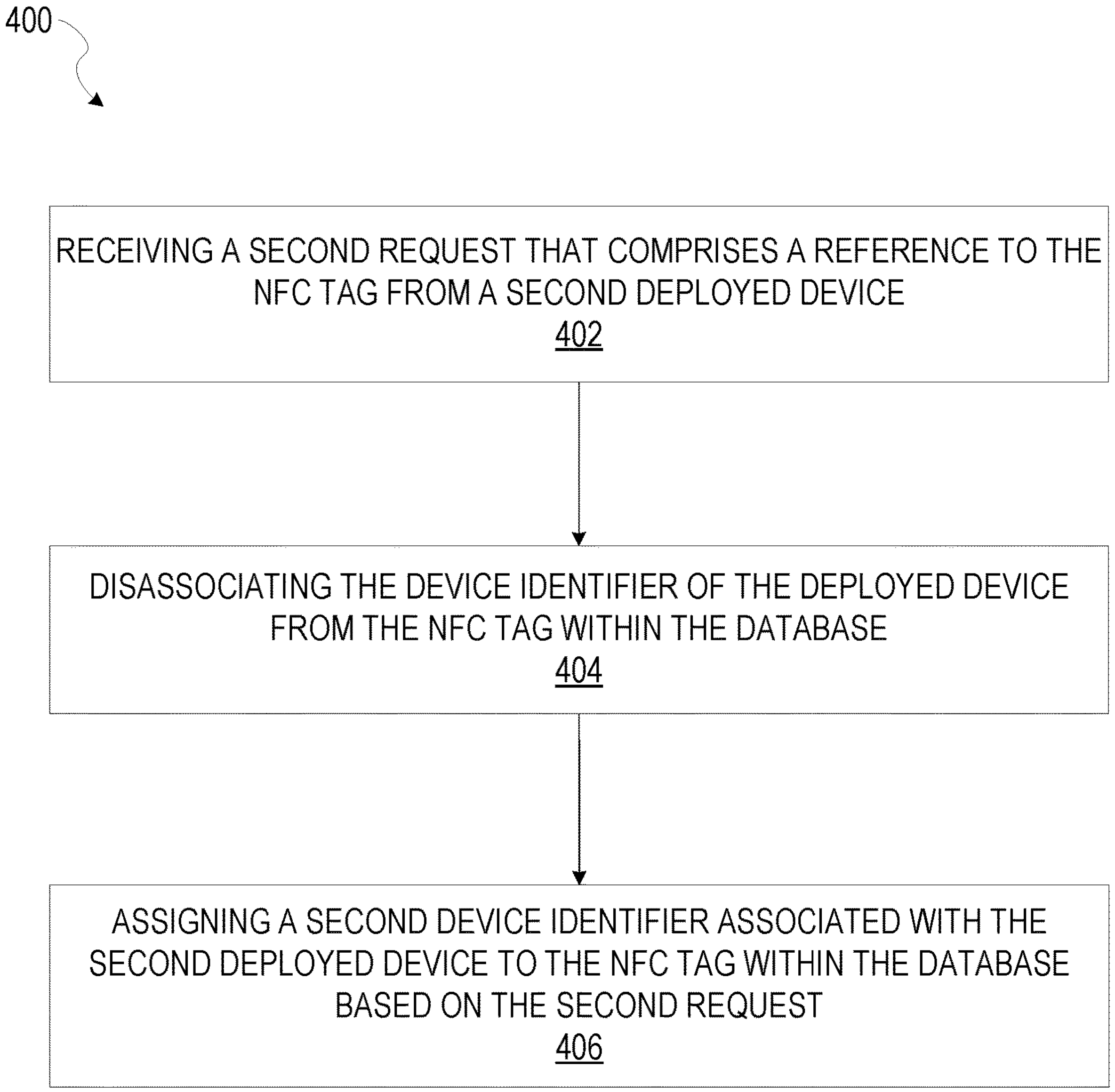
FIG. 4 is a flowchart depicting a method of assigning an asset identifier to a deployed device, according to certain example embodiments.

FIG. 4 is a flowchart depicting a method 400 of assigning an asset identifier to a deployed device 102, according to certain example embodiments. Operations of the method 400 may be performed by the modules described above with respect to FIG. 2. In some embodiments, the method 400 may be performed as a subroutine of one or more operations of the method 300, such as operation 304. As shown in FIG. 4, the method 400 includes one or more operations 402, 404, and 406.

At operation 402, the NFC module 202 receives a second request that comprises a reference to the NFC tag, from a second deployed device 102, wherein the second deployed device 102 corresponds with a second device identifier. For example, the deployed device 102 discussed in the method 300 of FIG. 3 may be a first deployed device 102 from among a plurality of deployed devices.

At operation 404, the identification module 204 determines that the second device identifier associated with the second deployed device 102 does not match a device identifier (i.e., a first device identifier) which may have been assigned to the NFC tag within the database 120. Accordingly, the NFC module 202 may disassociate the first device identifier associated with the first deployed device 102 from the NFC tag within the database 120.

At operation 406, the NFC module 202 assigns the second device identifier that corresponds with the second sensor device 102 with the NFC tag within the database 120, responsive to the request received from the second sensor device 102.

Figure 5:
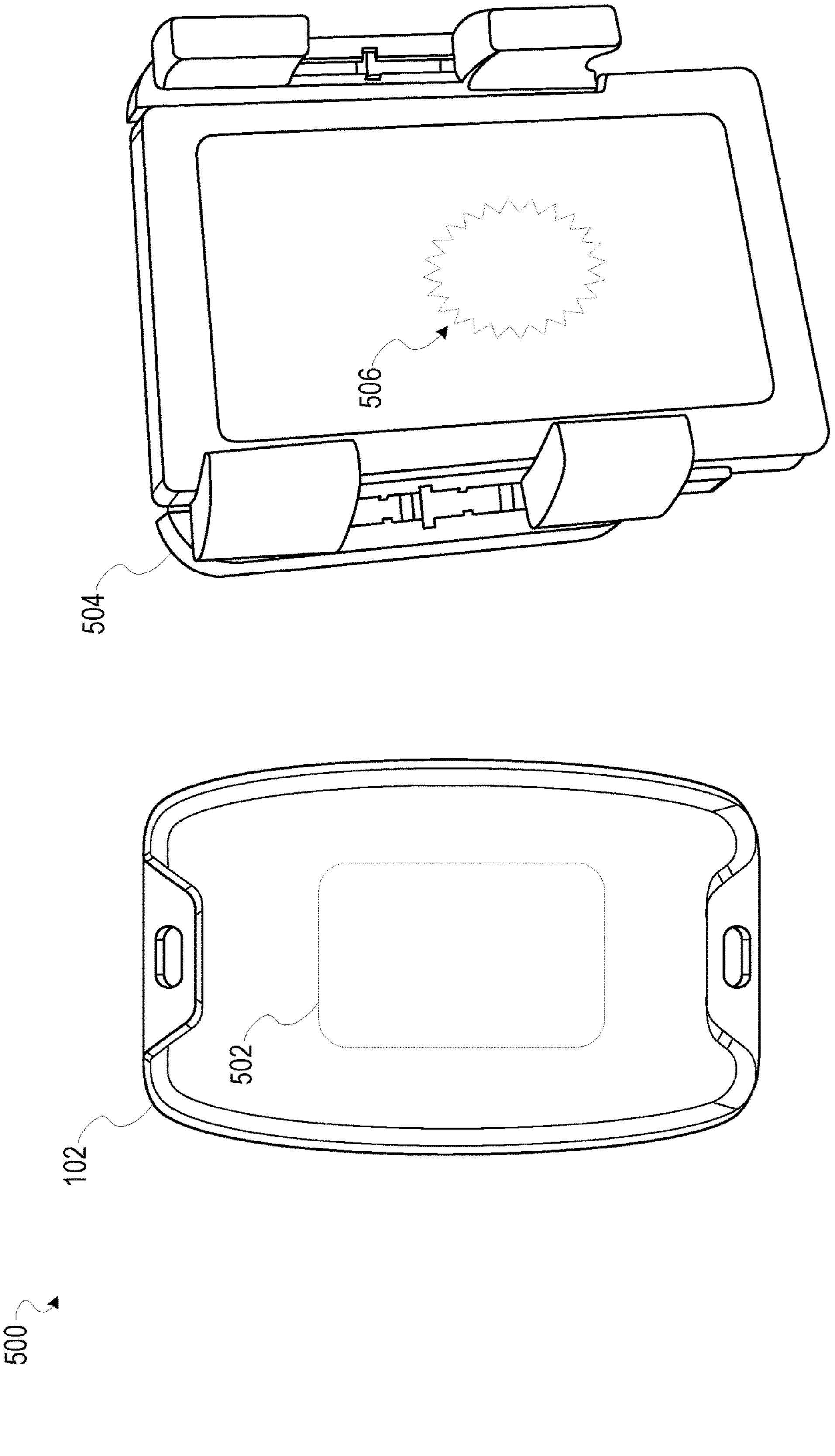
FIG. 5 is a diagram depicting a deployed device, according to certain example embodiments.

FIG. 5 is a diagram 500 depicting a deployed device 102, according to certain example embodiments. As seen in the diagram 500, the deployed device 102 may include an NFC reader 502 which may be integrated into the deployed device 102, enabling the deployed device 102 to detect an NFC tag within its proximity.

In some embodiments, a mounting device 504 may be configured to include an NFC tag 506, and wherein the NFC tag 506 may be associated with an asset identifier within the database 120, as described in operation 302 of the method 300. Accordingly, the mounting device 504 may be used to mount the deployed device 102 upon an asset that corresponds with the asset identifier.

The diagram 500 depicts the mounting device 504 as a bracket configured to retain the deployed device 102 using a set of retention clamps for illustrative purposes. In certain embodiments, the mounting device 504 may include one or more retention mechanisms to retain the deployed device 102, such as a strap, one or more magnets, suction, screws, bolts, and the like.

Figure 6:
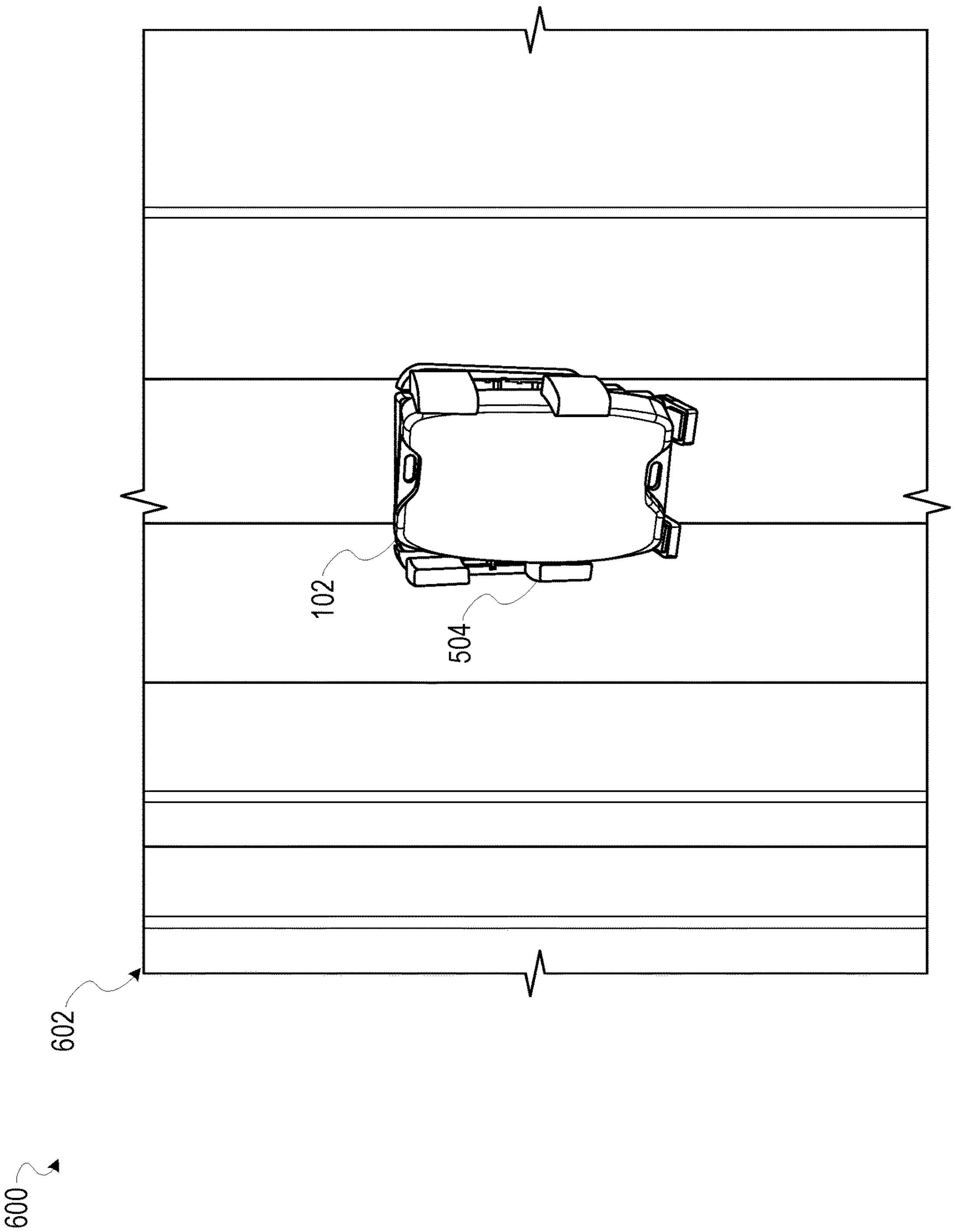
FIG. 6 is diagram depicting a deployed device, according to certain example embodiments.

FIG. 6 is a diagram 600 depicting a deployed device 102, according to certain example embodiments. As seen in the diagram 600, the mounting device 504 may retain a deployed device 102 upon a surface of an asset 602. For example, the asset 602 may include a shipping container. A user of the asset identification system 124 may attach the deployed device 102 to the asset 602 using the mounting device 504, wherein the mounting device 504 includes an NFC tag, such as the NFC tag 506. As discussed in the method 300, the deployed device 102 may include an NFC reader 502, which may detect the NFC tag 506 of the mounting device 504 responsive to coming into proximity with the mounting device 504.

Figure 7:
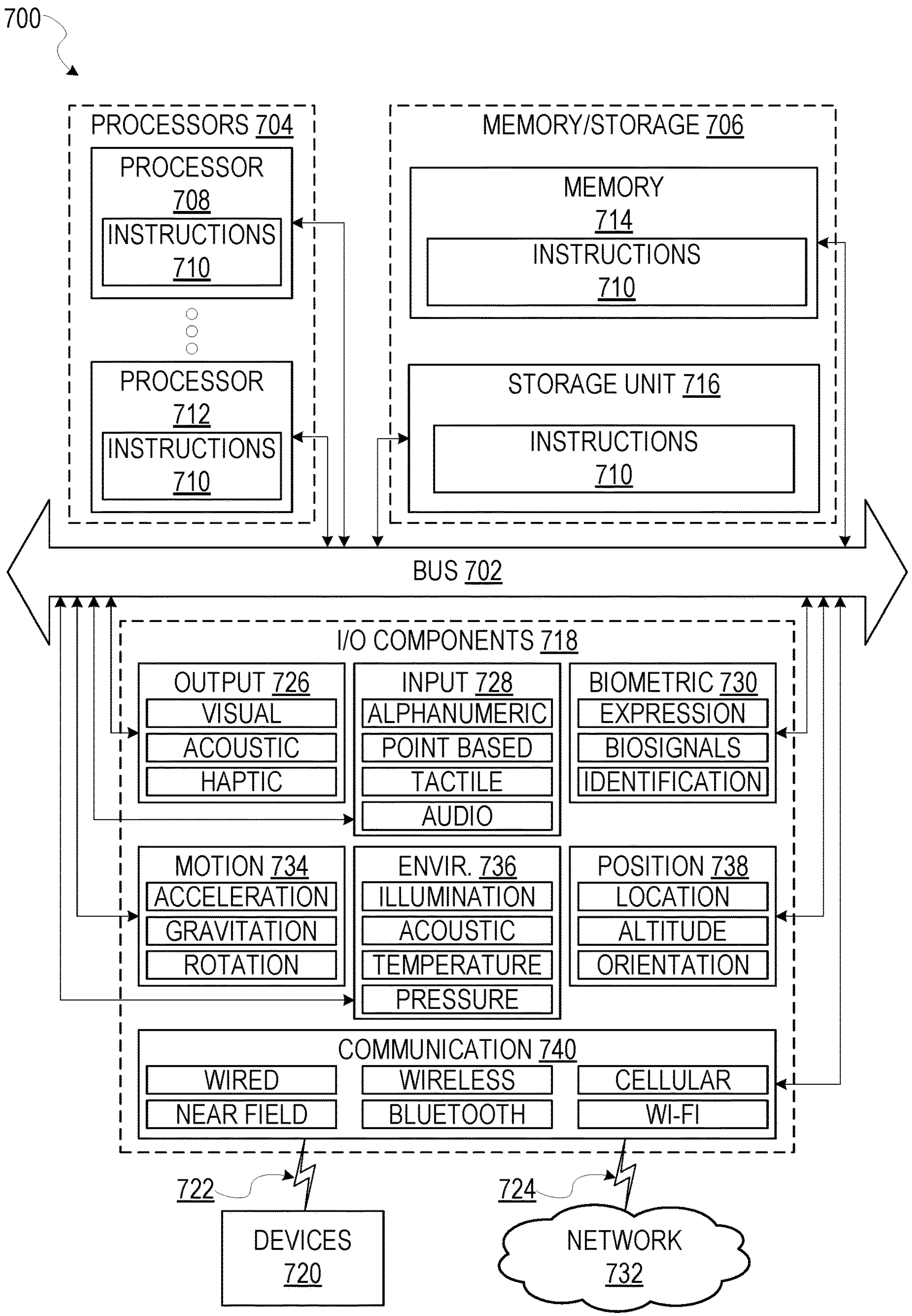
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:

assigning an asset identifier to an NFC tag within a database;

receiving, from a deployed device that is mounted in proximity to the NFC tag on a movable asset, a request that includes a reference to the NFC tag, the deployed device corresponding with a device identifier;

assigning the device identifier of the deployed device to the asset identifier within the database responsive to receiving the request;

receiving a data object from the deployed device responsive to movement of the movable asset, the movement of the movable asset moving both the deployed device and the NFC tag; and presenting a notification based on the data object, the notification includes a display of the asset identifier assigned to the device identifier of the deployed device at a position within a map image presented at a client device.

2. The method of claim 1, wherein the data object comprises location data and temporal data.

3. The method of claim 1, wherein the method further comprises applying the NFC tag to a bracket configured to retain the deployed device, and wherein the receiving the request that includes the reference to the NFC tag further comprises:

receiving the request from an NFC reader associated with the deployed device.

4. The method of claim 1, wherein the deployed device is a first deployed device, the device identifier is a first device identifier, the request is a first request, and wherein the method further comprises:

receiving, from a second deployed device, a second request that comprises the reference to the NFC tag; and assigning a second device identifier associated with the second deployed device with the asset identifier within the database responsive to receiving the second request.

5. The method of claim 1, wherein the presenting the notification based on the data object further comprises:

identifying the client device based on the asset identifier; and presenting the notification at the client device.

6. The method of claim 1, wherein the NFC tag comprises an address, and wherein the receiving the data object from the deployed device further comprises:

causing the deployed device to transmit the data object to the address associated with the NFC tag.

7. The method of claim 1, wherein the asset identifier corresponds with a notification attribute, and wherein the presenting the notification based on the data object further comprises:

presenting the notification based on the data object and the notification attribute associated with the asset identifier.

8. A system comprising:

a memory; and at least one hardware processor to perform operations comprising:

assigning an asset identifier to an NFC tag within a database;

receiving, from a deployed device that is mounted in proximity to the NFC tag on a movable asset, a request that includes a reference to the NFC tag, the deployed device corresponding with a device identifier;

assigning the device identifier of the deployed device to the asset identifier within the database responsive to receiving the request;

receiving a data object from the deployed device responsive to movement of the movable asset, the movement of the movable asset moving both the deployed device and the NFC tag; and presenting a notification based on the data object, the notification includes a display of the asset identifier assigned to the device identifier of the deployed device at a position within a map image presented at a client device.

9. The system of claim 8, wherein the data object comprises location data and temporal data.

10. The system of claim 8, wherein the operations further comprise applying the NFC tag to a bracket configured to retain the deployed device, and wherein the receiving the request that includes the reference to the NFC tag further comprises:

receiving the request from an NFC reader associated with the deployed device.

11. The system of claim 8, wherein the deployed device is a first deployed device, the device identifier is a first device identifier, the request is a first request, and wherein the operations further comprise:

receiving, from a second deployed device, a second request that comprises the reference to the NFC tag; and assigning a second device identifier associated with the second deployed device with the asset identifier within the database responsive to receiving the second request.

12. The system of claim 8, wherein the presenting the notification based on the data object further comprises:

identifying the client device based on the asset identifier; and presenting the notification at the client device.

13. The system of claim 8, wherein the NFC tag comprises an address, and wherein the receiving the data object from the deployed device further comprises:

causing the deployed device to transmit the data object to the address associated with the NFC tag.

14. The system of claim 8, wherein the asset identifier corresponds with a notification attribute, and wherein the presenting the notification based on the data object further comprises:

presenting the notification based on the data object and the notification attribute associated with the asset identifier.

15. A non-transitory machine-readable storage medium comprising instructions that, when executed by one or more processors of a machine, cause the machine to perform operations comprising:

assigning an asset identifier to an NFC tag within a database;

receiving, from a deployed device that is mounted in proximity to the NFC tag on a movable asset, a request that includes a reference to the NFC tag, the deployed device corresponding with a device identifier;

assigning the device identifier of the deployed device to the asset identifier within the database responsive to receiving the request;

receiving a data object from the deployed device responsive to movement of the movable asset, the movement of the movable asset moving both the deployed device and the NFC tag; and presenting a notification based on the data object, the notification includes a display of the asset identifier assigned to the device identifier of the deployed device at a position within a map image presented at a client device.

16. The non-transitory machine-readable storage medium of claim 15, wherein the data object comprises location data and temporal data.

17. The non-transitory machine-readable storage medium of claim 15, wherein the operations further comprise applying the NFC tag to a bracket configured to retain the deployed device, and wherein the receiving the request that includes the reference to the NFC tag further comprises:

receiving the request from an NFC reader associated with the deployed device.

18. The non-transitory machine-readable storage medium of claim 15, wherein the deployed device is a first deployed device, the device identifier is a first device identifier, the request is a first request, and wherein the operations further comprise:

receiving, from a second deployed device, a second request that comprises the reference to the NFC tag; and assigning a second device identifier associated with the second deployed device with the asset identifier within the database responsive to receiving the second request.

19. The non-transitory machine-readable storage medium of claim 15, wherein the presenting the notification based on the data object further comprises:

identifying the client device based on the asset identifier; and presenting the notification at the client device.

20. The non-transitory machine-readable storage medium of claim 15, wherein the NFC tag comprises an address, and wherein the receiving the data object from the deployed device further comprises:

causing the deployed device to transmit the data object to the address associated with the NFC tag.

* * * * *